SOLID STATE DISPLAY DEVICE USING LIGHT EMITTING DIODES

Filed Oct. 31, 1966 6 Sheets-Sheet 1

INVENTOR
ROBERT J. LYNCH

BY Thomas & Thomas
ATTORNEYS

SOLID STATE DISPLAY DEVICE USING LIGHT EMITTING DIODES

Filed Oct. 31, 1966 6 Sheets-Sheet 2

SOLID STATE DISPLAY DEVICE USING LIGHT EMITTING DIODES

Filed Oct. 31, 1966 6 Sheets-Sheet 6

3,517,258

SOLID STATE DISPLAY DEVICE USING LIGHT EMITTING DIODES

Robert John Lynch, Endicott, N.Y., assignor to International Business Machines Corporation, Armonk, N.Y., a corporation of New York Filed Oct. 31, 1966, Ser. No. 590,843
Int. Cl. H05b *39/04*
U.S. Cl. 315—169 11 Claims

ABSTRACT OF THE DISCLOSURE

A display arrangement has light emitting diodes arranged in columns and rows to form an array. A horizontal gable generator energizes the rows, and a vertical gable generator energizes the columns. Each gable generator provides a pointed or gable-shaped signal distribution across the respective rows and columns, and variable signal means connected to the gable generators supply modulation or video signals for controlling the generation of characters, letters, etc. by selectively illuminating various light emitting diodes.

CROSS-REFERENCES TO RELATED APPLICATIONS

Application Ser. No. 279,531 for Radiation Scanner Employing Rectifying Devices and Photoconductors filed May 10, 1963 by Robert J. Lynch et al., now Pat. 3,317,733.

Application Ser. No. 460,233 for Scanner Employing Unilaterally Conducting Elements and Including a Circuit for Generating a Pointed Voltage Distribution, filed June 1, 1965 by Robert J. Lynch et al., now Pat. 3,400,271.

Application Ser. No. 460,081 for Two Dimensional Scanner Having Back-To-Back Photodiodes, filed June 1, 1965 by Robert J. Lynch et al., now Pat. 3,400,272.

BACKGROUND OF THE INVENTION (1) This invention relates to display devices for presenting images or characters, and it relates more particularly to such display devices which use solid state elements such as light emitting diodes and the like.

(2) In the above listed patents there is described a unique scheme for creating a voltage peak, resembling a gable, which can be electronically positioned in a photo-sensitive diode array. The voltage peak, however, is created in series with a back-biased diode, and this prevents the device from serving as a current driver with substantial power whereby its use may not be expanded beyond those functions which are sampling or sensory in nature.

SUMMARY OF THE INVENTION

Accordingly, it is a feature of this invention to provide a voltage peak or gable signal which can be electronically positioned in an array of light-emitting elements with sufficient power to drive one or more selected elements into light emission whereby a visual signal might be displayed. The ability to position electronically the peak of a gable signal to a selected point of a matrix array of light-emitting elements such as photo diodes enables such devices to perform for display purposes in a manner similar to the well known cathode ray tube.

It is a feature of this invention to provide a display device which employs solid state illuminating elements in a matrix arrangement with a gable signal driver for the horizontal axis and a gable signal driver for the vertical axis, thereby permitting selective energization of the individual solid state illuminating elements in the array.

It is another feature of this invention to provide a display device which uses solid state illuminating elements with a gable signal generator having a positive peak supplied to one axis of the array and a gable signal generator having a negative dip supplied to the other axis of the array whereby individual solid state elements of the array may be selectively energized by coincident application of said positive and negative gable signals.

It is another feature of this invention to provide an improved gable signal generator.

It is another feature of this invention to provide an improved gable signal generator which is capable of supplying power to a load device.

It is still a further feature of this invention to use one gable signal generator with a positive peak signal and another gable signal generator with a negative dip signal in combination to supply current sufficient to meet the needs of a load device such as a solid state illuminating element e.g. light emitting diodes and the like.

In one arrangement according to this invention a plurality of light emitting diodes constructed of gallium phosphide are arranged in a coordinate array of rows and columns with a plurality of X drive lines along one axis and a plurality of Y drive lines along another axis. The light emitting diodes are connected between the X and Y drive lines at each coordinate intersection. A first drive circuit is connected to the Y drive lines for generating a pointed voltage distribution, or gable shaped signal, across said Y drive lines, and a second drive circuit is connected to the X drive lines for generating a pointed voltage distribution, or gable signal across, the X drive lines. The first drive circuit includes a plurality of first circuit groups each including a transistor and diode connected in series, a first and a second resistive means for attenuating signals applied thereacross, the first resistive means having each transistor of the first circuit groups connected thereto at different locations, and the second resistive means having each diode of the first circuit groups connected thereto at different locations. The first drive circuit also includes first signal generating means for applying signals to the first and second resistive means to produce a series of voltage levels on the transistors which progressively increase through the sequentially located circuit groups and to produce a series of voltage signals on the diodes which progressively decrease through the sequentially located circuit groups, whereby a voltage distribution having a pointed shape is produced at the junctions between the transistors and the diodes of each of the first circuit groups. The second drive circuit includes a plurality of second circuit groups, each including first and second diodes connected in series, and it includes a third and a fourth resistive means for attenuating signals applied thereacross. The third resistive means has each first diode of the second circuit groups connected thereto at different locations with the fourth resistive means having each second diode of the second circuit groups connected thereto at different locations. The second drive circuit further includes second signal generation means for applying signals to the third and fourth resistive means to produce a series of voltage levels on the first diodes which progressively increase in one direction through the sequentially located second circuit groups and to produce a series of voltage levels on the second diodes which progressively decrease in the same direction through the sequentially located second circuit groups, whereby a voltage distribution having a pointed shape is produced at the junction between the first and second diodes of the second circuit groups. The Y drive lines are connected to the junctions of the transistor and the diode of the first circuit groups, and the X drive lines are connected to the junctions of the first and second diodes of the second circuit groups. Variable signal means is connected to the first and second drive circuits for supplying modulation or video signals for controlling the generation of characters, letters, numbers and the like on the solid state display device.

The foregoing and other objects, features and advantages of the invention will be apparent from the following more particular description of preferred embodiments of the invention, as illustrated in the accompanying drawings.

DESCRIPTION OF THE PREFERRED EMBODIMENTS (One dimensional array)

Figure 1:
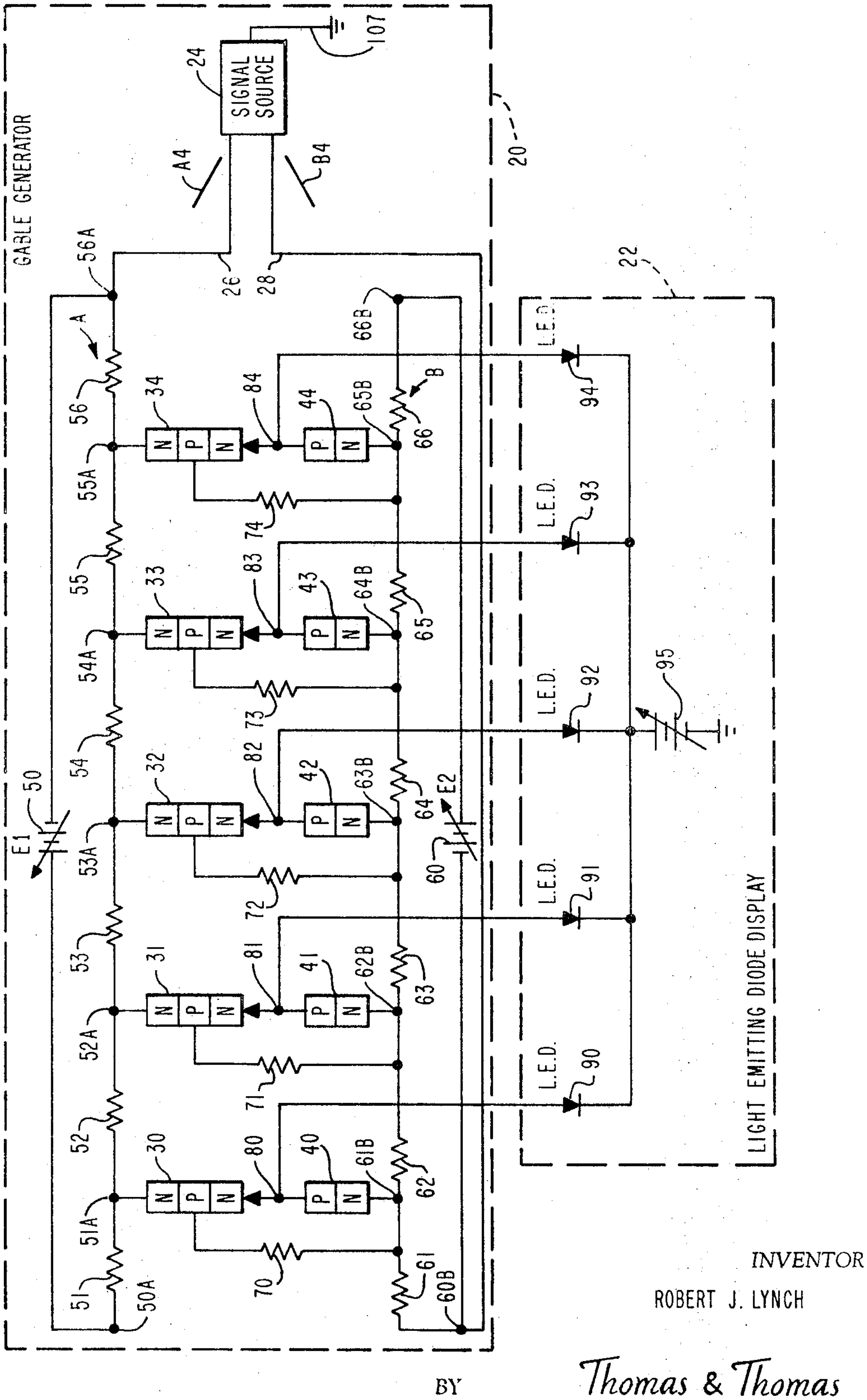
FIG. 1 illustrates a one-dimensional display device constructed according to this invention.

Reference is made first to FIG. 1 which shows a gable generator 20 and a display arrangement 22 of light emitting diodes. The gable generator 20 provides a voltage peak or gable signal which is electronically positioned in the diode array or arrangement 22. A signal source 24 is included as part of the generator 20 and it provides complementary signals on conductor lines 26 and 28 as will be explained in greater detail hereinafter. The gable generator further includes transistors 30 through 34, the respective emitter electrodes of which are connected as shown to the diodes 40 through 44, respectively. An adjustable battery 50 is connected at the junctions 50A and 56A across resistors 51 through 56 which serve as a potential divider. The divider is tapped in a symmetrical manner by the respective collector electrodes of transistors 30 through 34 such as, for example, at bleeder junctions 51A through 55A, respectively. An adjustable battery 60 is connected at the junctions 60B and 66B across resistors 61 through 66 which serve as a potential divider that is also tapped in a symmetrical manner by the diodes 40 through 44 such as, for example, at bleeder junctions 61B through 65B, respectively. Each of the base electrodes of the transistors 30 through 34 is electrically connected by a respective resistor 70 through 74 to a particular bleeder junction 61B through 65B. Between the transistors 30 through 34 and associated diodes 40 through 44 are respective junction joints 80 through 84 which act as the output terminals of the gable generator 20 and are connected to respective light emitting diodes 90 through 94. A biasing voltage for the diodes 90 through 94 is commonly provided by the adjustable D.C. source or battery 95.

Figure 1A:
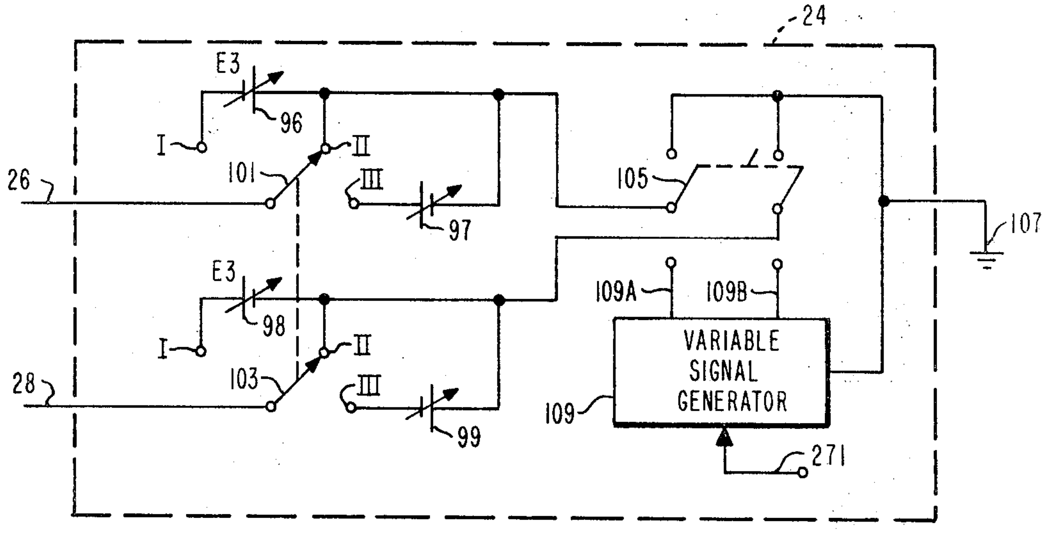
FIG. 1A is a schematic diagram of an embodiment of a signal source 24 which may be used in the gable generator 20 of FIG. 1.

In FIG. 1A, there is llustrated one embodiment of a signal source 24 which may be included with the gable generator 20 of FIG. 1. The illustrated source 24 in coaction with the batteries 50 and 60 provides various signals which provide alternate ways of positioning the output gable of generator 20 as will become apparent hereinafter. Accordingly, it comprises a series of adjustable D.C. generators, shown schematically by way of example as multitapped batteries 96 through 99, each tap of which is connected to an exclusive contact of the commonly ganged single pole triple throw switches 101 and 103. In positions I of switches 101 and 103, the negative terminal of battery 96 and the opposite terminal, i.e. the positive one, of battery 98 are connected to conductors 26 and 28, respectively. In positions III, it is the positive terminal of battery 97 and the opposite negative terminal of battery 99 to which conductors 26 and 28 are connected, respectively. The left arm of the double pole double throw switch is connected to the other terminals of batteries 96, 97 and its right arm is connected to the other terminals of batteries 98, 99. In the intermediary positions II of switches 101, 103 batteries 96 through 99 are by-passed and conductors 26 and 28 are connected to the left and right arms, respectively, of switch 105. The upper contacts of switch 105 are connected to ground 107, and each of the lower contacts is connected to an exclusive one of the output terminals 109A, 109B of the variable signal generator 109, which generates recurring or periodic signals on each of its output terminals which are in opposite phase relationship. Conductors 26 and 28 are connected to junctions 56A and 60B as shown in FIG. 1.

Let it be assumed arbitrarily for purposes of discussion that the upper potential divider, or potentiometer, is designated A and the lower potentiometer is designated B. Each of the diodes 40 through 44 clamps the respective voltage level of the potentiometer B appearing at its respective associated junction 61B through 65B to the emitter of the particular transistor 30 through 34 to which the diode is connected when the B level appearing at its respective junction 61B through 65B is lower than the voltage level appearing at the respective junction 51A through 55A of potentiometer A to which is connected the collector of the particular transistor. In addition, each of the transistors 30 through 34 clamps the respective voltage level of the potentiometer A appearing at its respective junction 51A through 55A to the particular diode 40 through 44 coupled to the transistor's emitter when the A level appearing at its respective junction 51A through 55A is lower than the B level appearing at the respective junction 61B through 65B to which the particular diode is connected. The operation of the circuit is such that the emitter of each transistor clamps to the lower of the bleeder potentials of potentiometer A or B with which it is associated. In one mode of operation, these bleeder potentials and the level of the battery 95 insure that all but on light emitting diode are back biased. The one diode which is forward biased draws current, and it is thereby illuminated. For a detailed description of the operation of a gable generator in general, reference is made to the above-mentioned copending applications.

Figure 2J:
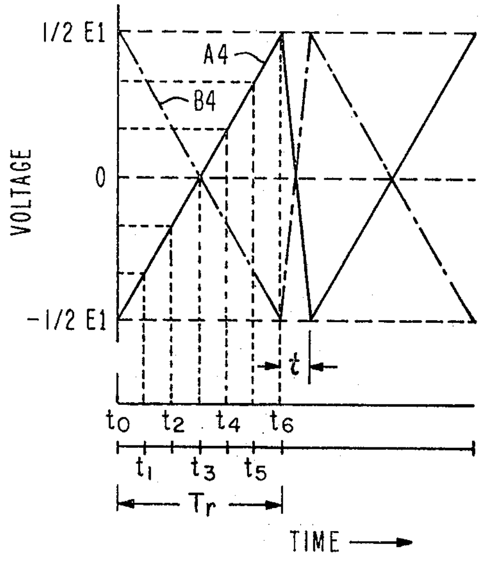
FIGS. 2A–2K are waveforms useful in explaining the operation of the elements in FIGS. 1 and 1A.
Figure 2K:
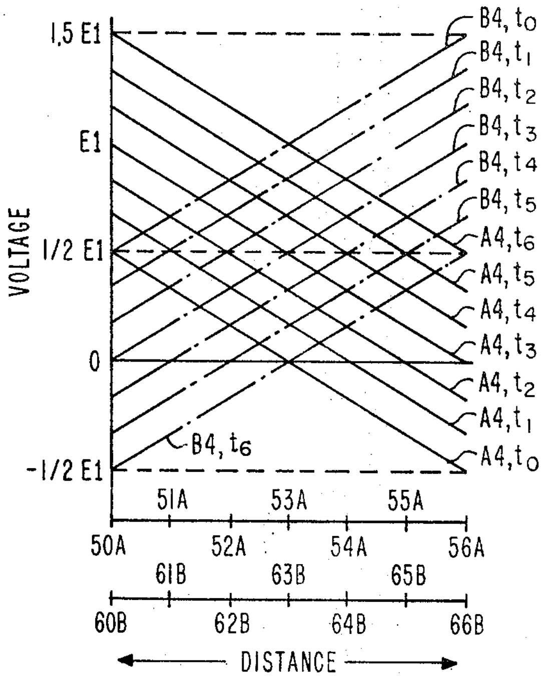
Figure 2A:
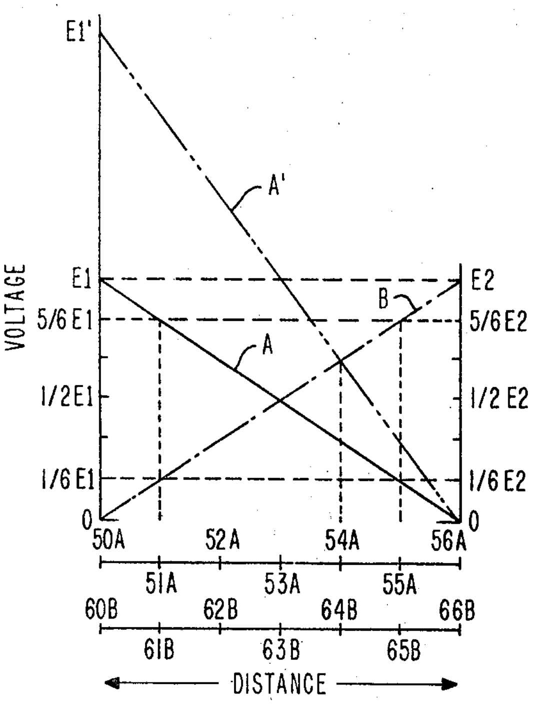
Figure 2C:
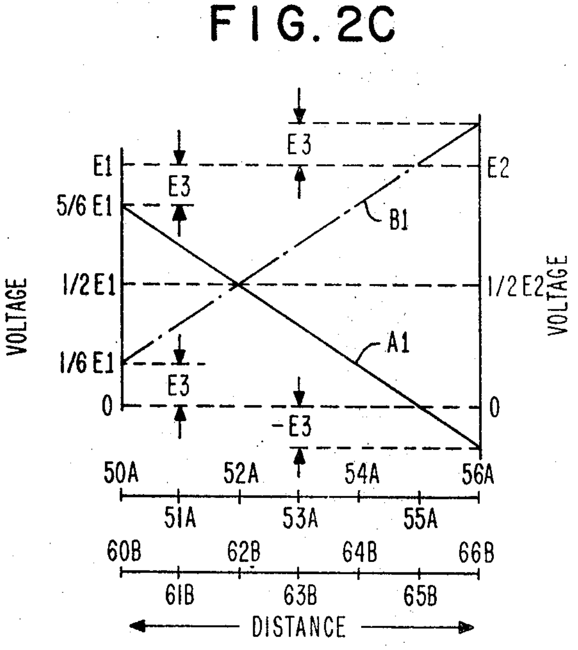
Figure 2B:
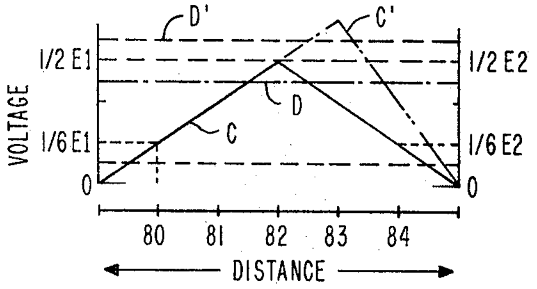

Turning now to a more detailed discussion of the operation of the gable generator 20 in connection with the array 22, it will be assumed for the sake of simplicity that the switches 101 and 103 are in closed positions II and switch 105 is in its closed upper position thereby connecting junctions 56A and 60B to ground 107. FIG. 2A illustrates a plot of the voltage distribution, indicated therein by the curves A and B, respectively, across the resistors 51 through 56 and across resistors 61 througn 66. As illustrated in FIG. 2A, the voltage levels E1 and E2 of batteries 50 and 60, respectively, are adjusted to be equal, i.e. E1=E2. As such, the voltage distribution across the six resistors 51 through 56 decreases respectively from E1 to 0 or ground at increments of 1/6 E1, as shown by the curve A, FIG. 2A. In addition, the voltage level across the six resistors 61 through 66 increases respectively from 0 to E2 also at increments of 1/6 E2, as illustrated by curve B, FIG. 2A. In accordance with the previous discussion, the potential distribution across the output junctions 80 through 84 will be the lower potential of the two potentials appearing at the bleeder junctions with which it is associated. For example, as shown from the curves A and B, FIG. 2A, the potential level at bleeder junction 51A of the symmetrically tapped potentiometer A, FIG. 1, is 5/6 E1 and the level at the associated bleeder junction 61B of the symmetrically tapped potentiometer B, FIG. 1, is 1/6 E2 (=1/6 E1) and consequently the associated output junction 80 is at a potential level of 1/6 E2. On the other hand, the level at junction 55A is at 1/6 E1 and the level at junction 65B is at 5/6 E2 (=5/6 E1) and consequently their associated output junction 84 is at a level of 1/6 E1. At junctions 53A and 63B the potential levels are equal (1/2 E1=1/2 E2) and consequently the potential level is 1/2 E1 at junction 82. Curve C of FIG. 2B shows a plot of the voltage distribution across the length of the array 22 in FIG. 1. It is readily observed that a gable-shaped waveform exists in terms of voltage versus distance across the input of the diode display with the peak of a level 1/2 E1 occurring at junction 82. By judiciously selecting the voltage level D of battery 95 with respect to the voltage peak, one or more light emitting diodes can be illuminated. In FIG. 2B for the positive gabled peak of waveform C and battery 95 level D shown therein, the generator 20 serves to light the light emitting diode 92.

One of the ways for moving the peak of the gable to the left or right in the array 22 is accomplished by simply adjusting the level of one or more of the batteries 50 or 60. For example, by increasing the level E1 of battery 50 to E1′, a voltage distribution is provided across resistors 51 through 56 illustrated by the curve A′, FIG. 2A, which intersects the B curve at the point corresponding to the junctions 54A, 64B. As a result, a potential distribution occurs across the junctions 80 through 84 having the gable waveform C′, FIG. 2B, with a peak appearing at the junction 83. The level of the peak of gable C′ is larger than the level of the peak of gable C as shown in FIG. 2B. Under these circumstances and for the level D of battery 95, illustrated in FIG. 2B, two light emitting diodes 92, 93 will be illuminated. If it were desired to illuminate light emitting diode 93 exclusively, then the level of battery 95 would also be adjusted to a higher magnitude, e.g. level D′, FIG. 2B, which would be sufficient to back bias light emitting diode 92 and to maintain light emitting diode 93 in a forward bias condition. As is obvious from FIGS. 2A, 2B, the peak of the gable may be moved to junction 83 by lowering the level of the battery 60 so that it intersects the curve A, FIG. 2A, at the junctions 54A, 64B and adjusting the level of battery 95 to illuminate the light emitting diode 92 and/or one or more of the adjacent light emitting diodes, if desired. Obviously, the same results could be obtained by adjusting both the levels of batteries 50 and 60 so that their respective potential distributions intersect at junctions 54A, 64B and cause a gable peak at the junction 83. In those cases where it is desired to maintain the level of the peak at a constant amplitude or magnitude for its various positions, the levels of both batteries 50, 60 can be adjusted such that their corresponding distribution curves will always intersect at the desired amplitude level as is apparent from the graphs of FIGS. 2A and 2B. Thus, as is obvious to those skilled in the art, the output gable peak may also be moved to the left, e.g. to junction 61B, by simply adjusting one or both of the levels of batteries 50 and 60. The adjustments of the batteries 50, 60 and/or 95 may be accomplished by manual or automatic means and in a sequential or simultaneous manner, and could be cycled to occur on a recurring basis, if desired, as is obvious to those skilled in the art.

Figure 2D:
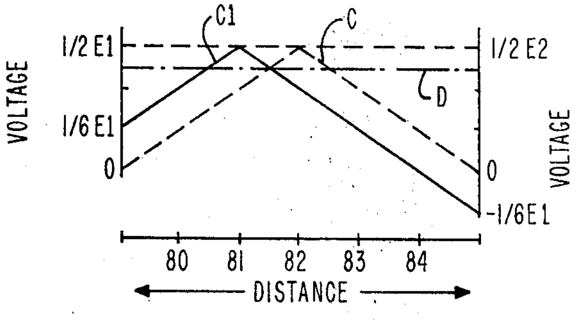

Another way the peak of the gable can be made to move along the input of the diode network is by raising and lowering the potentials at junctions 56A and 60B, respectively, with the aid of the signal generators of source 24 thereby selecting the diode(s) to be illuminated. By way of illustration, to switch the peak of gable C, FIG. 2B, to the left, for example, from junction 82 to junction 81, switches 101 and 103 are moved to their closed positions I. The batteries 96 and 98, it will be assumed, have been adjusted to equal levels E3−1/6 E1. As a result, a voltage distribution across resistors 51 through 56 illustrated by the curve A1, FIG. 2C, is provided wth the negative potential level −E3 from battery 96 appearing at junction 56A. Similarly, a potential distribution across resistors 61 through 66 occurs which is illustrated by the curve B1, FIG. 2C, with the positive potential level +E3 from battery 98 appearing at junction 60B. As a result, a gabled potential distribution C1, FIG. 2D, occurs at the output junctions 80 through 84 with the peak appearing at junction 81. With the aforementioned level D for battery 95, light emitting diode 91 will be illuminated and previously illuminated light emitting diode 92 extinguished when the gable C, shown in outline form FIG. 2D and its associated peak shifts from its position at junction 82 to its new position as shown by curve C1 at junction 81. By increasing the magnitude of the batteries 96 and 98 to twice E3, the peak of the gable is further moved to the junction 80 and light emitting diode 90 is illuminated and light emitting diode 91 is extinguished. By placing the switches in their closed positions III, the peak of gable C, FIG. 2B, may be moved to the right by adjustment of the batteries 97 and 99. Again, depending on the level D of battery 95, one or more light emitting diodes may be illuminated in either of the positions I or III. The adjustment of the levels of the batteries 96 through 99 and/or 95 may be accomplished by manual or automatic means and could be cycled to occur on a recurring basis, if desired, as is obvious to those skilled in the art.

Still another way of operating the scan generator 20 is provided. According to this way, the switches 101 and 103 are placed in their respective closed positions II and the switch 105 is placed in its lower closed position so as to connect the two output terminals 109A and 109B of signal generator 109 to junctions 56A and 60B, respectively. Signal generator 109, as aforementioned, provides periodic signals on its output terminals 109A, 109B which are in opposite phase relationship.

Figure 2E:
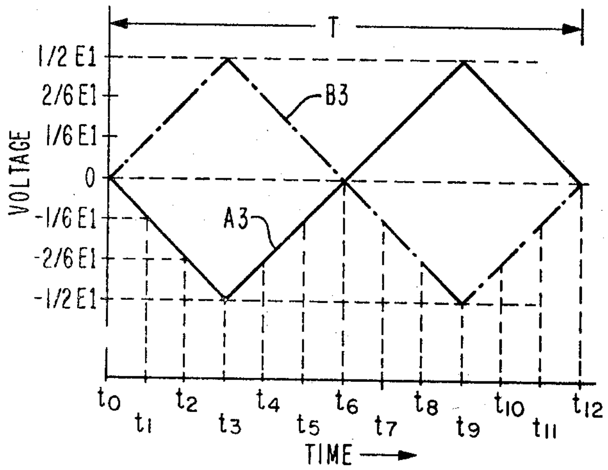
Figure 2F:
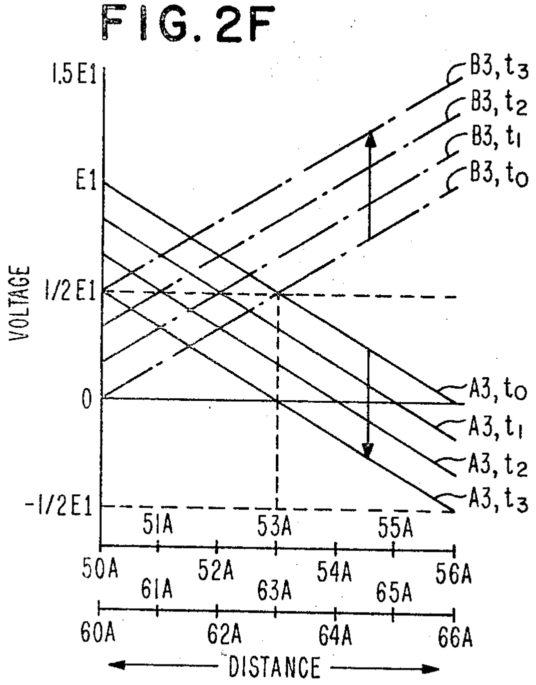
Figure 2G:
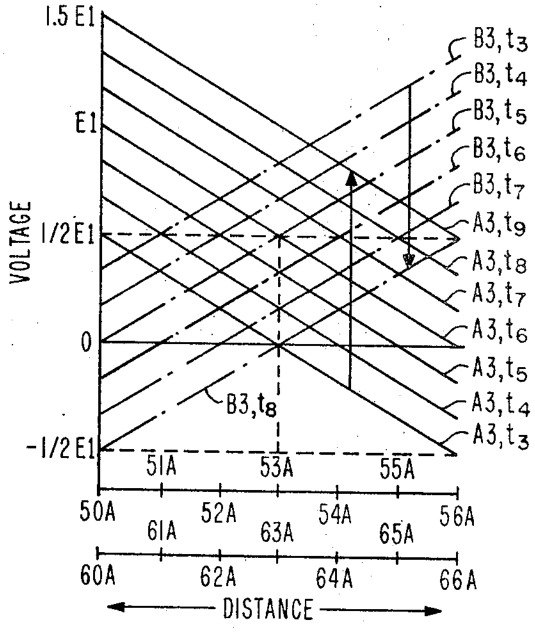
Figure 2H:
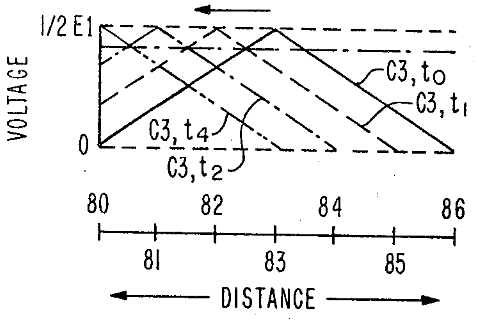
Figure 2I:
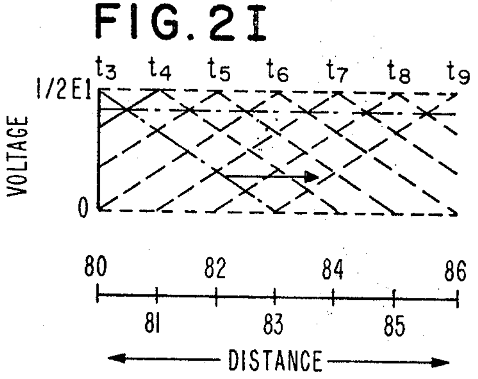

By way of example, there is shown in FIG. 2E one cycle of a triangular waveform signal illustrated as a solid line A3 which is generated at the terminal 109A and another triangular waveform signal, illustrated therein as a dash-dot line B3, of opposite phase is generated at the terminal 109B. FIGS. 2F and 2G illustrate the family of respective voltage distribution curves which are derived from signals A3, B3 and which appear across the respective junctions 50A through 56A and junctions 60A through 66A at the respective times T0 through T9. As illustrated by the vertical arrows in FIG. 2F, the voltage distribution curves associated with the signal A3 descend and those associated with the signal B3 ascend during the period T0 through T3. Similarly, in FIG. 2G, the voltage distribution curves associated with the signals A3 and B3 during the respective times T3 through T9 ascend and descend, respectively, as indicated by the vertical arrows therein. As a consequence, the peak of the gable of the voltage distribution curve C3, which is derived from the corresponding voltage distribution curves associated with the signals A3, B3 at the different times T0 through T9, will first move from right to left sequentially through junctions 83, 82, 81, 80 during the times T0 through T3 as indicated by the horizontal arrow in FIG. 2H and then move from left to right sequentially through junctions 80 through 86 during the times T3 through T9, as shown by the horizontal arrow in FIG. 2I. During the times T9 through T12, not shown, the peak of the gable will travel back sequentially from right to left through junctions 86, 85, 84 and will end with the peak coinciding with the center junction 83. Thus the light emitting diodes will be illuminated in the following sequence: 92, 91, 90, 91, 92, 93, 94, 93, 92 during each period T of the signals A3, B3. By appropriately adjusting the amplitude of the signals A3, B3, the scanning or sweeping of the array may be limited, if desired, to a certain number of diodes on each side of the light emitting diode 92. By appropriately selecting the time period T of the scanning signals A3, B3, to be compatible with the persistence of vision of the eye, the illuminated light emitting diodes can be made to appear as a continuous illuminated line, if also desired. As is obvious from FIG. 2F, the signals of generator 109 may have other configurations such as, for example, sinusoidal, sawtooth, etc. and the like.

As described hereinabove, the sweeping or illumination of the light emitting diodes initiates at the center light emitting diode 92 of the array 22 illustrated in FIG. 1. As is obvious to those skilled in the art, the geometric layout of the light emitting diodes with respect to each other may have other diverse configurations such as, for example, in the form of alphabetical and numerical characters and/or may also have other linear spatial relationships with respect to one another. Thus it is possible to arrange the light emitting diodes 90 through 94 in a vertical array, such as might be used in an instrument indicator device, with the light emitting diodes aligned, for example, in the following ascending sequence: 93, 91, 90, 93, 94 with the same electrical connections to respective junctions 80 through 84 as shown in FIG. 1, and thereby cause initiation of the sweeping action to occur with the bottom light emitting diode 92 in such an arrangement.

However, for a predetermined and fixed spatial relationship of light emitting diodes 90 through 94, as shown in FIG. 1, it is possible to bias the potentiometers A, B, such that scanning action initiates at a light emitting diode other than the center light emitting diode 92. For example, let it be assumed that the switches 101 and 103 are placed in their upper closed positions I and the batteries 96, 98 are adjusted to the levels $-\frac{1}{2}$ E1 and $+\frac{1}{2}$ E1, respectively. Furthermore, let it be assumed that the switch 105 is in its lower closed position and the signal generator 109 generates complementary sawtooth signals. The signal on terminal 109A goes from a zero level to a +E1 on terminal 109A and the other signal goes from a +E1 to a zero level on terminal 109B during their respective coincidence rise time T*r*. Under these conditions, the signals of generator 109, in conjunction with the biasing levels of batteries 96 and 98 will provide at the junctions 56A and 60B signals A4 and B4, respectively, as illustrated in FIG. 2J. In coaction with the battery levels E1=E2 of batteries 50 and 60, these signals provide a voltage distribution across the respective junctions 50A through 56A and junctions 60A through 66A such that the peak of the gable will originate at time T0 at junction 80 and travel from right to left through junctions 81, 82, 83, 84, 85 and 86 during the successive time T1 through T6 as can be derived from FIG. 2K. At the end of the respective rise times T*r* in FIG. 2J the signals A4 and B4 return to their respective initial levels during the fly back time T and the cycle is repeated. As a consequence, the light emitting diodes of the array 22 are sequentially illuminated in the following order: 90, 91, 92, 93, 94 during each period T*r* of the cycle. By appropriately selecting the respective times T*r* and T, the light emitting diodes 92 can be made to appear to be as a continuously illuminated line. Furthermore, if it were desired to illuminate only a predetermined number of diodes, e.g. light emitting diodes 90, 91 and 92, then the signals from generator 109 need only sweep to the time period T3. Thus, as is readily appreciated by those skilled in the art, if the generator 109 is made responsive to an analog or digital signal, the number of light emitting diodes illuminated thereby will be a visual representation or indication of the analog or digital signal.

SOLID STATE LIGHT EMITTING ELEMENT

Figure 3:
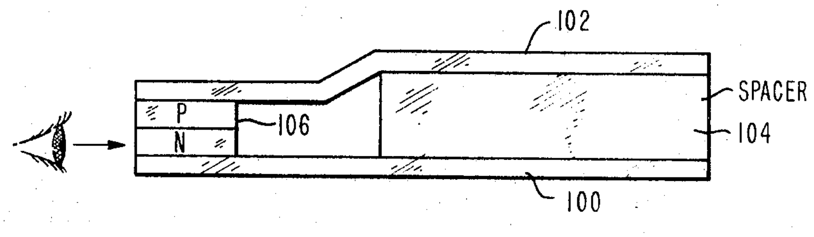
FIG. 3 shows a side elevation view of a light emitting diode employed in this invention.
Figure 4:
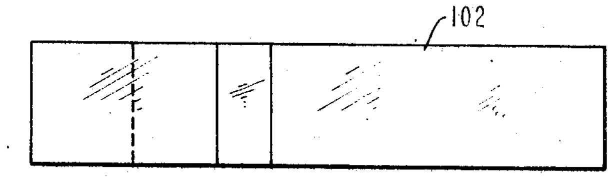
FIG. 4 is a plan view of FIG. 3.

One type of light emitting diode is illustrated in FIG. 3. It includes a lower mount 100 and an upper mount 102, preferably molybdenum plates, separated by a spacer 104 which may be beryllium oxide. A light emitting diode 106, preferably made of gallium phosphide, is disposed between the upper and lower mounts. Electrical contact is made with the diode 106 by wire soldered directly to the metal strips 100 and 102. Electrical contact may be made by inserting the diode into a phenolic socket designed to fit into the mount. Sockets of varying configurations may be employed to support linear diode arrays or mosaic arrays for alphanumeric displays. This packaging arrangement facilitates maintenance since a burned out or damaged diode may be replaced easily. FIG. 4 is a plan view of FIG. 3. It is pointed out that this construction is quite small as the mount measures approximately ½ inch in length and approximately 30 x 40 mils along each edge with the gallium phosphide diode in place. In an array, such as array 22, the ends of diodes 106 are aligned to be viewed in the direction indicated by the arrow in FIG. 3.

Figure 5:
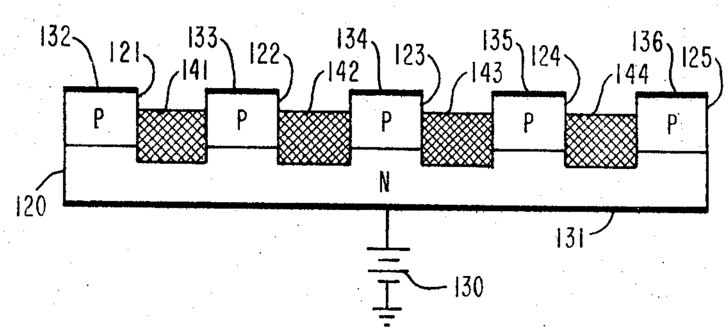
FIG. 5 shows an arrangement of a plurality of light emitting diodes having a common base.

FIG. 5 illustrates a construction wherein an N type substrate 120 has P type overgrowth elements 121 through 125 which provide planar N-P junctions which are relatively free from gross defects. With this type of construction the external differential quantum efficiency has been increased to as high as $7.5\times10^{-3}$. A battery 130 is connected to a lower electrode 131. Upper electrodes 132 through 136 are provided on respective elements 121 through 125. Since light is generated at the junction of the N-P materials, light from one junction may pass to adjacent junctions and appear to emanate therefrom. To prevent this, pieces of opaque material 141 through 144 are disposed between the diode elements 121 through 125. Thus individual N-P junctions of the elements 121 through 125 may be selectively energized and lighted without passing light laterally to adjacent N-P junctions. It is feasible to grow a unitary structure of P-N materials and cut a grid pattern in the P or N material, thereby forming a compact matrix of solid state devices.

Figure 6:
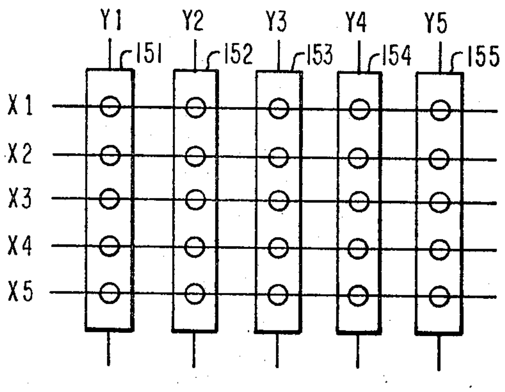
FIG. 6 illustrates a two dimensional arrangement of light emitting diodes.

A plurality of devices of the type illustrated in FIG. 5 may be employed in a matrix arrangement such as illustrated in FIG. 6. The lower electrodes of the devices 151 through 155 are connected to respective Y conductors Y1 through Y5. The P type overgrowth elements are illustrated in FIG. 6 as being circular in form, but it is understood that they may be square, rectangular or of any other selected configuration. Corresponding P type elements are connected to respective ones of the X conductors X1 through X5 as shown.

It is pointed out that gallium phosphide light emitting diodes are useful as visible light sources. The forbidden gap for gallium phosphide is 2.24 ev. at 300° K., and thus they can accommodate radiative limitations from 5600 A. to the infrared. The emitted radiation is actually a result of indirect transitions to impurity levels within the material. Diodes which are doped with shallow donors and acceptors, partially compensating one another in both N and P regions, give rise to bright green emissions. Deep donor, shallow acceptor recombinations result in red emission (1.77 ev.) 7,000 A. In the past diodes fabricated by diffusion or alloying into bulk material resulted typically in low quantum yields with efficiencies of $10^{-6}$ to $10^{-5}$ to be expected at room temperature. Gallium phosphide single crystals are grown by slow cooling of gallium phosphide saturated gallium solution. The cooling results in a mass of dendritic crystals from which platelets reaching approximately 1 cm.$^2$ with a thickness of about 1 mm. are chosen. These are lapped on one side and mechanically polished on the other side with the platelets retaining the (×11) surface.

The process of epitaxial solution growth is used for preparing P-N junctions. The substrate crystal is held down in one end of a graphite boat with a quartz pin. In the other end of the boat a gallium-gallium phosphide mixture is placed and the appropriate dopant added. The boat is enclosed in a quartz tube and held in an atmosphere of forming gas and heated to about 1140° C. The boat is then tipped so that the saturated gallium solution covers the substrate. After slow cooling the epitaxially overgrown substrate is isolated from the gallium-gallium phosphide mixture by blowing in a solution of hydrochloric acid and water. The final steps of plating and cleaving complete the formation of the light emitting diode.

TWO DIMENSIONAL ARRAY

Figure 7:
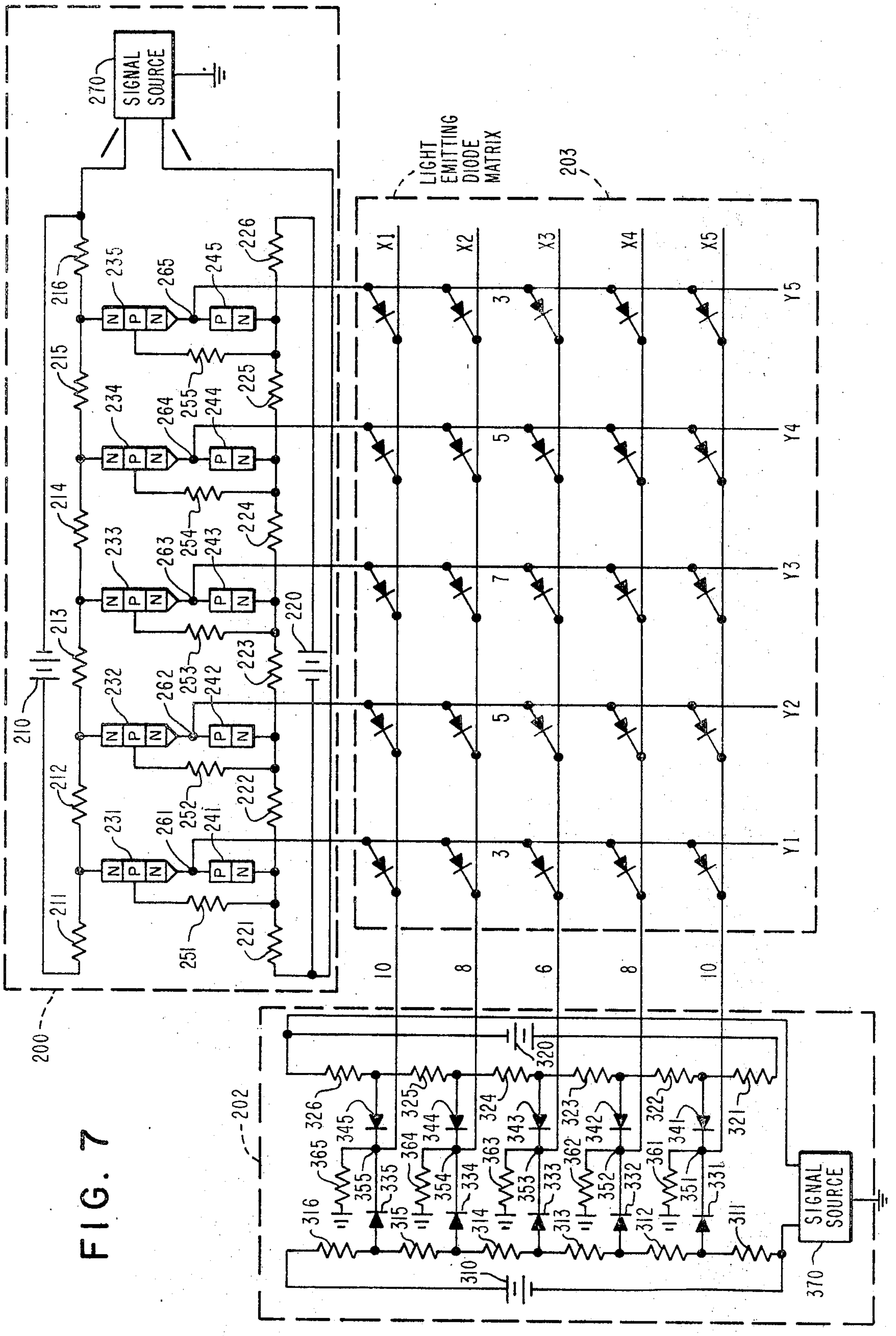
FIG. 7 illustrates in detail a light emitting diode matrix with one gable generator supplying power to the vertical drive lines and another gable signal generator supplying power to the horizontal lines according to this invention.

Reference is made next to FIG. 7 which illustrates a two-dimensional display matrix of light emitting diodes. Gable generators 200 and 202 provide the respective vertical and horizontal signals for selectively energizing individual diodes of the light emitting diode matrix 203. The gable generator 200 supplies current to the matrix 203, and the gable generator 202 receives current from the matrix 203.

The gable generator 200 includes a battery 210 across which a plurality of resistors 211 through 216 are connected to form a potential divider. In like fashion a battery 220 and series connected resistors 221 through 226 form a potential divider. A plurality of transistors 231 through 235 are connected in series with associated diodes 241 through 245 in the manner shown. Resistors 251 through 255 are connected between the base electrodes of the respective transistors 231 through 235 and the right end of respective resistors 221 through 225. The junction points 261 through 265 of the gable generator 200 are connected to the respective vertical lines Y1 through Y5 of the light emitting diode matrix 203. A signal source 270 is preferably like that illustrated in FIG. 1A.

The gable generator 202 includes a battery 310 connected across resistors 311 through 316 to form one potential divider, and a battery 320 is connected across resistors 321 to 326 to form another potential divider. Diodes 331 through 335 are connected in series with respective diodes 341 through 345 between the two potential dividers in the manner illustrated. Junction points 351 through 355 are connected to ground through respective resistors 361 through 365. The junction points 355 through 351 are connected also to respective horizontal lines X1 through X5. A signal source 370 is preferably like that illustrated in FIG. 1A.

The diode matrix 203 in FIG. 7 may be swept in the same fashion as a television raster with the gable generators 200 and 202. In this case the magnitudes of the coincident gable-shaped signals from the generators 200 and 202 are arranged to be insufficient, when taken by themselves, to light a diode at the selected coordinate intersection. In essence all light emitting devices are back biased or dark. However, if signals equivalent to the usual video information are supplied to either or both of the gable generators 200 and 202, they may change the magnitude and phase of either or both of the gable signals sufficiently to cause the selected diode to be forward biased and thereby lighted. The equivalent of a television raster is obtained by increasing the frequency of the signal source 270 over that of the signal source 370 whereby the gable generator 200 energizes each vertical line Y1 through Y5 in turn as the gable generator 202 energizes each selected horizontal line in sequence. As indicated earlier, the signal sources 270 and 370 are preferably of the type illustrated in FIG. 1A. When generating a television type raster, the signal source 270 has its switches 101 and 103 in FIG. 1A set to position II, and the switch 105 is closed so as to connect the variable signal generator 109 to the output lines. The variable signal generator 109 is made to supply complementary sawtooth signals to the output line. The variable signal generator 109 has an input line 271 which is connected to a source of video signals, not shown. The signal source 370 in FIG. 7 has its switches 101 and 103 in FIG. 1A set to position II, and its switch 105 is set to connect the variable signal generator 109 to the output line. Video signals from a source, not shown, may be supplied on the input line 271 in FIG. 1A to the variable signal generator 109. The gable generator 200 provides a gable signal which has a positive peak, and the gable generator 202 supplies a gable signal which has a negative dip. The horizontal line which receives the negative dip and the vertical line which receives the positive peak determine the selected light emitting diode in the matrix 203. The selected diode is not lighted in the absence of video information. However, the matrix 203 is swept in a fashion similar to a television raster, and when video information is presented, it is displayed. Under these conditions, the video signal modulates the voltage across the sequentially illuminated light emitting diodes and consequently the intensity of the individual light emitting diodes will be modulated in accordance with the video information. Solid state display devices are desirable because they are light in weight and rugged in construction when compared with television and other types of cathode ray tube devices. Furthermore, solid state display devices are desirable since they require relatively small amounts of electrical power for operation.

An alternative mode of operating the display device in FIG. 7 provides Lissajous patterns where such is desired. This may be accomplished by setting the switches of the signal source 270 and the signal source 370 such that the switches 101 and 103 are set to position II, and the switch 105 connects the variable signal generator 109 to the output line. The variable signal generator 109 in the signal source 270 may supply a sine wave, and the variable signal generator 109 of the signal source 370 may supply a cosine wave, thereby to generate one Lissajous pattern on the light emitting diode matrix 203. Other Lissajous patterns may be generated on the light emitting diode matrix 203 by having the variable signal generator 109 of the signal sources 270 and 370 supply various shaped wave forms of a continuous type.

It should be understood that while the embodiments of the invention are described herein with a particular number and kind of light-emitting elements which are in a given spatial arrangement, and as utilizing NPN transistor types, that the invention can be practiced with other numbers and/or spatial arrangements of light-emitting elements, and/or the circuitry modified in a complementary manner to operate with PNP transistor types in a manner well known to those skilled in the art.

Thus, while the invention has been particularly shown and described with reference to preferred embodiments thereof, it will be understood by those skilled in the art that various changes in form and details may be made therein without departing from the spirit and scope of the invention.

What is claimed is:

1. A solid state display device including:

a plurality of light emitting diodes arranged in an array, the array including a plurality of X and Y drive lines with a light emitting diode connected between the X and Y drive lines at each coordinate intersection, a first drive circuit connected to the Y drive lines for generating a pointed voltage distribution across said Y drive lines.

a second drive circuit connected to the X drive lines for generating a pointed voltage distribution across said X drive lines, said first drive circuit including a plurality of first circuit groups each including a transistor and a diode connected in series, a first and a second resistive means for attenuating signals applied thereacross, said first resistive means having each transistor of said first circuit groups connected thereto at different locations, and said second resistive means having each diode of said first circuit groups connected thereto at different locations, first signal generating means for applying signals to said first and second resistive means to produce a series of voltage levels on said transistors which progressively increase through said sequentially located circuit groups and to produce a series of voltage levels on said diodes which progressively decrease through said sequentially located circuit groups, whereby a voltage distribution having a pointed shape is produced at the junctions between the transistor and the diode of each said first circuit groups, means connecting the Y drive lines to said first circuit groups with the associated Y drive line being connected to the junction of said transistor and diode, said second drive circuit including a plurality of second circuit groups each including first and second diodes connected in series, a third and a fourth resistive means for attenuating signals applied thereacross, said third resistive means having each first diode of said second circuit groups connected thereto at different locations, said fourth resistive means having each second diode of said second circuit groups connected thereto at different locations, second signal generating means for applying signals to said third and fourth resistive means to produce a series of voltage levels on said first diodes which progressively increase in one direction through said sequentially located second circuit groups and to produce a series of voltage levels on said second diodes which progressively decrease in the same direction through said sequentially located second circuit groups, whereby a voltage distribution having a pointed shape is produced at the junction between the first and second diodes of said second circuit groups, means connecting the X drive lines to said second circuit groups with the associated X drive line being connected to the junction of said first and second diodes, individual resistive means connected between ground and each of the junctions of said first and second diodes of said second circuit groups, and variable signal means connected to said first drive circuit and said second drive circuit for supplying modulation or video signals for controlling said solid state display device, whereby each light emitting diode of said array may be individually selected and lighted for the purpose of displaying characters, symbols and the like.

2. A solid state display device including a plurality of light emitting diodes arranged in an array, the array including a plurality of X and Y drive lines with a light emitting diode connected between the X and Y drive lines at each coordinate intersection, a first drive circuit connected to the Y drive lines for generating a pointed voltage distribution across said Y drive lines, a second drive circuit connected to the X drive lines for generating a pointed voltage distribution across said X drive lines, and variable signal means connected to said first and second drive circuits for changing the pointed voltage distribution across said X drive lines and said Y drive lines, whereby the light emitting diodes arranged in said array may be selectively lighted.

3. The apparatus of claim 2 wherein said first drive circuit includes a plurality of first circuit groups each including a transistor and a diode connected in series, a first and a second resistive means for attenuating signals applied thereacross, said first resistive means having each transistor of said first circuit groups connected thereto at different locations, and said second resistive means having each diode of said first circuit group connected thereto at different locations, and signal generating means for applying signals to said first and second resistive means to produce a series of voltage levels on said transistors which progressively increase through said sequentially located circuit groups and to produce a series of voltage levels on said diodes which progressively decrease through said sequentially located circuit groups.

4. The apparatus of claim 3 wherein said second drive circuit includes a plurality of second circuit groups each including first and second diodes connected in series, a third and a fourth resistive means for attenuating signals applied thereacross, said third resistive means having each first diode of said second circuit groups connected thereto at different locations, said fourth resistive means having each second diode of said second circuit groups connected thereto at different locations, and second signal generating means for applying signals to said third and fourth resistive means to produce a series of voltage levels on said first diodes which progressively increase in one direction through said sequentially located second circuit groups and to produce a series of voltage levels on said second diodes which progressively decrease in the same direction through said sequentially located second circuit groups.

5. A solid state display device including:

a plurality of light emitting diodes, a drive circuit connected to the light emitting diodes for generating a pointed voltage distribution thereacross, and said drive circuit including a plurality of circuit groups each including a transistor and a diode connected in series, a first and a second resistive means for attenuating signals applied thereacross, said first resistive means having each transistor of said circuit groups connected thereto at different locations, and said second resistive means having each diode of said circuit groups connected thereto at different locations, and signal generating means for applying signals to said first and second resistive means to produce a series of voltage levels on said transistors which progressively increase through said circuit groups in one direction and to produce a series of voltage levels on said diodes which progressively decrease through said circuit groups in the same direction, whereby a voltage distribution having a pointed shape is produced at the junctions between the transistor and the diode of each of said circuit groups.

6. The apparatus of claim 5 wherein individual ones of the plurality of diodes are connected to individual ones of said circuit groups at the junction of the transistor and the diode in each circuit group.

7. The apparatus of claim 6 wherein each one of the plurality of diodes is connected to a bias source.

8. The apparatus of claim 7 wherein a source of variable signals is coupled to the signal generating means.

9. A display device including:

a plurality of light emitting diodes, a drive circuit connected to the light emitting diodes for generating a pointed voltage distribution thereacross, said drive circuit including:

a plurality of circuit groups each including an amplifier and a rectifier connected in series, a first and a second resistive means for attenuating signals applied thereacross, said first resistive means having each amplifier of said circuit groups connected thereto at different locations, and said second resistive means having each rectifier of said circuit groups connected thereto at different locations, a first bias source connected across said first resistive means to produce a series of voltage levels on said amplifiers which progressively increase through said circuit groups in one direction, a second bias source connected across said second resistive means to produce a series of voltage levels on said rectifiers which progressively decrease through said circuit groups in the said one direction, whereby a voltage distribution having a pointed shape or gable is produced at the junctions between the amplifier and the rectifier of each of said circuit groups, and said amplifier of each circuit group having a control electrode and a resistor connected between said control electrode and said second resistive means.

10. The apparatus of claim 9 wherein a source of variable signals is coupled to the first and second resistive means whereby the gable peak may be varied in position.

11. The apparatus of claim 9 wherein each of said amplifiers comprises a transistor and each of said rectifiers comprises a semiconductor diode, and said control electrode further comprises the base electrode of said transistor.

References Cited

UNITED STATES PATENTS

| | | | |
|---|---|---|---|
| 3,015,747 | 1/1962 | Rosenberg | 313—108 |
| 3,048,824 | 8/1962 | Thompson | 340—173 |
| 3,154,720 | 10/1964 | Cooperman | 315—169 |
| 3,175,090 | 3/1965 | Reis et al. | 250—209 |
| 3,327,163 | 6/1967 | Blank | 315—169 |
| 3,388,255 | 6/1968 | May | 250—209 |

JOHN W. HUCKERT, Primary Examiner

S. BRODER, Assistant Examiner

U.S. Cl. X.R.

340—324